United States Patent
Shin (10) Patent No.: US 7,102,882 B2
(45) Date of Patent: Sep. 5, 2006

(54) DEVICE SWAPPING APPARATUS FOR PORTABLE COMPUTER

(75) Inventor: Hyo-Sik Shin, Suwon (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/066,382

(22) Filed: Feb. 28, 2005

(65) Prior Publication Data

US 2006/0098401 A1    May 11, 2006

(30) Foreign Application Priority Data

Nov. 5, 2004    (KR)    ............. 10-2004-0090046

(51) Int. Cl.
*G06F 1/16* (2006.01)
*H05K 5/00* (2006.01)
*H05K 7/00* (2006.01)

(52) U.S. Cl. .............. 361/683; 361/684; 361/685; 361/754; 361/798

(58) Field of Classification Search ......... 361/683, 361/684, 685, 724, 725, 726, 727, 754, 798; 307/150; 429/96–100; 174/138 G; 312/332.1, 312/333

See application file for complete search history.

(56) References Cited

U.S. PATENT DOCUMENTS

| | | | | |
|---|---|---|---|---|
| 5,293,300 A | * | 3/1994 | Leung | ............. 361/683 |
| 5,311,455 A | * | 5/1994 | Ho | ............. 361/685 |
| 5,563,767 A | * | 10/1996 | Chen | ............. 361/685 |
| 5,694,290 A | * | 12/1997 | Chang | ............. 361/685 |
| 5,740,012 A | * | 4/1998 | Choi | ............. 361/686 |
| 5,995,365 A | * | 11/1999 | Broder et al. | ............. 361/685 |
| 6,017,106 A | * | 1/2000 | Adams et al. | ............. 312/223.2 |
| 6,064,567 A | * | 5/2000 | Cheng | ............. 361/685 |
| 6,205,021 B1 | * | 3/2001 | Klein et al. | ............. 361/683 |
| 6,469,900 B1 | * | 10/2002 | Cheng | ............. 361/726 |
| 6,618,259 B1 | * | 9/2003 | Hood et al. | ............. 361/740 |

* cited by examiner

*Primary Examiner*—Lynn Feild
*Assistant Examiner*—Ingrid Wright
(74) *Attorney, Agent, or Firm*—Fleshner & Kim LLP (57) ABSTRACT

Embodiments of a device swapping apparatus and method for a portable computer have advantages in that the detachable device detachably mounted to the portable computer can be easily detached from the portable computer or that the installation space can be reduced. An embodiment of a device swapping apparatus can include a seating space at a side of a detachable device, a driving rod with a rod body where at least a part of which is always positioned within the seating space, and a front handle selectively protruding forwardly from the housing. A cam and cam follower can selectively operate so that the rod body can be either fastened in or protrudes from the seating space whenever the driving rod is pushed into the seating space. An elastic member can provide an elastic force against the driving rod.

19 Claims, 13 Drawing Sheets

DEVICE SWAPPING APPARATUS FOR PORTABLE COMPUTER

BACKGROUND OF THE INVENTION

1. Field of the Invention

The present invention relates to a portable computer, and more particularly, to a device swapping apparatus for a portable computer.

2. Background of the Related Art

A portable computer has a light, thin and small configuration for the sake of convenience of portability. A device to be selectively used in the portable computer is detachably mounted into a bay of a main unit of the portable computer. Examples of devices to be detachably mounted into a bay include optical disk drives, batteries, heat radiating units, and the like. As an example of such devices, an optical disk drive will be herein described.

Figure 1:
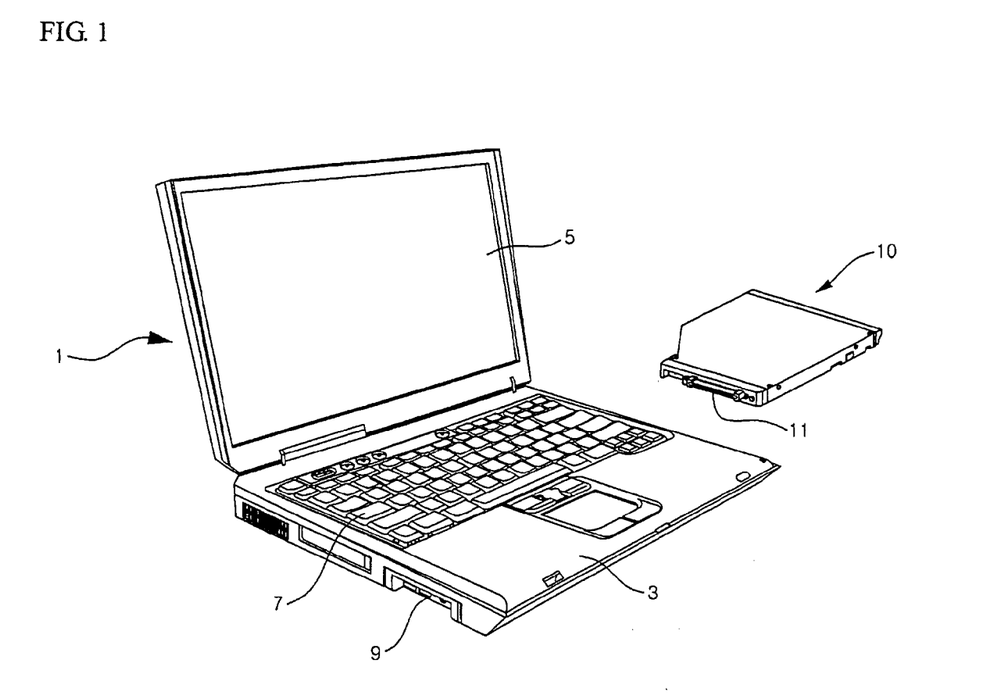
FIG. 1 is a diagram showing an exploded perspective view of the configuration of a general portable computer.

FIG. 1 is an exploded perspective view showing an external appearance of a general portable computer. Referring to FIG. 1, the portable computer 1 generally includes a main unit 3 and a display unit 5. The main unit 3 generally takes the shape of a flat rectangular plate and includes various kinds of parts of a notebook computer 1 including a main board, a CPU, a memory, a hard disk drive 9, an optical disk drive 10, a battery and the like. Further, a keyboard 7 is provided on a top surface of the main unit 3.

Although the hard disk drive 9 is configured to be detachably mounted to the portable computer, it is necessarily used to operate the notebook computer 1. However, the optical disk drive 10 is not necessarily used to operate the notebook computer 1. Therefore, the optical disk drive 10 can be selectively mounted into a bay (not shown) formed in the main unit 3 of the portable computer. On the other hand, if the optical disk drive 10 is not mounted in the bay, an additional device such as an auxiliary battery can be mounted therein. The optical disk drive 10 includes a connector 11.

A liquid crystal panel is generally employed in the display unit 5, which is connected to a rear end of the main unit 3, so that the display unit is folded to or unfolded from the top surface of the main unit 3. The display unit 5 is formed to take the same shape of a flat rectangular plate as the main unit 3.

The optical disk drive 10 is used in a state where it is inserted in the bay of the main unit 3. At this time, an additional mechanism can be used to fasten the optical disk drive 10 to the main unit 3 such that the optical disk drive is not inadvertently detached from the main unit 3.

However, the related art portable computer described above has various disadvantages. For example, when the optical disk drive 10 was inserted in the bay of the main unit 3, it is not easy to detach the optical disk drive 10 from the main unit 3. The reason is that when the optical disk drive 10 is mounted into the bay, the connector 11 is connected to another connector in the main unit 3 and a front end of the optical disk drive 10 does not protrude from the main unit 3.

Further, a certain mechanism for allowing the optical disk drive 10 to be pushed outwardly from the portable computer may be installed within the bay of the main unit 3. However, the mechanism for allowing the optical disk drive 10 to be pushed outwardly occupies a large space in the bay, and an additional structure for transmitting a force applied by a user to the mechanism should also be installed in the main unit 3. Thus, this configuration also hinders the portable computer from being made light, thin and small.

The above references are incorporated by reference herein where appropriate for appropriate teachings of additional or alternative details, features and/or technical background.

SUMMARY OF THE INVENTION

An object of the invention is to solve at least the above problems and/or disadvantages or to provide at least the advantages described hereinafter.

Another object of the present invention is to provide a device swapping apparatus capable of swapping devices detachably mounted to a portable computer.

Another object of the present invention is to reduce or minimize a space occupied by a device swapping apparatus for swapping the devices detachably mounted to the portable computer.

Another object of the present invention is to simplify the configuration of a device swapping apparatus used in the portable computer.

Another object of the present invention is to provide a device swapping apparatus capable of swapping devices detachably mounted to a portable computer that can reduce costs or increase reliability of the device.

In order to achieve at least these objects or advantages in a whole or in part, and in accordance with the purpose of the invention, as embodied and broadly described herein, there is provided a device swapping apparatus for a portable computer that can include a detachable device and a handle provided at a side of the detachable device, wherein the handle is within the area of the detachable device, wherein the handle moves between a first position extending partially outside the detachable device and a second position, and wherein the handle is removed with the detachable device.

To further achieve at least these objects or advantages in a whole or in part, and in accordance with the purpose of the invention, as embodied and broadly described herein, there is provided a device swapping apparatus for a portable computer that can include a housing coupled within a lateral surface of a detachable device having a seating space therein, a driving rod including a rod body slidingly positioned within the seating space of the housing, and a front handle configured to selectively protrude forward from the housing, a cam and cam follower configured to selectively operate so that the rod body is either fastened in or protrudes from the seating space whenever the driving rod is pushed into the seating space and an elastic member configured to provide an elastic force in a direction to urge the driving rod from the seating space.

To further achieve at least these objects or advantages in a whole or in part, and in accordance with the purpose of the invention, as embodied and broadly described herein, there is provided a portable computer that can include a main body rotatably attached to a display body, a device detachably installed in a side surface of the main body and a handle integrally provided along a side surface inside a case of the device, wherein the handle is configured to move between at least two positions, and wherein the handle is removed with the device.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 2:
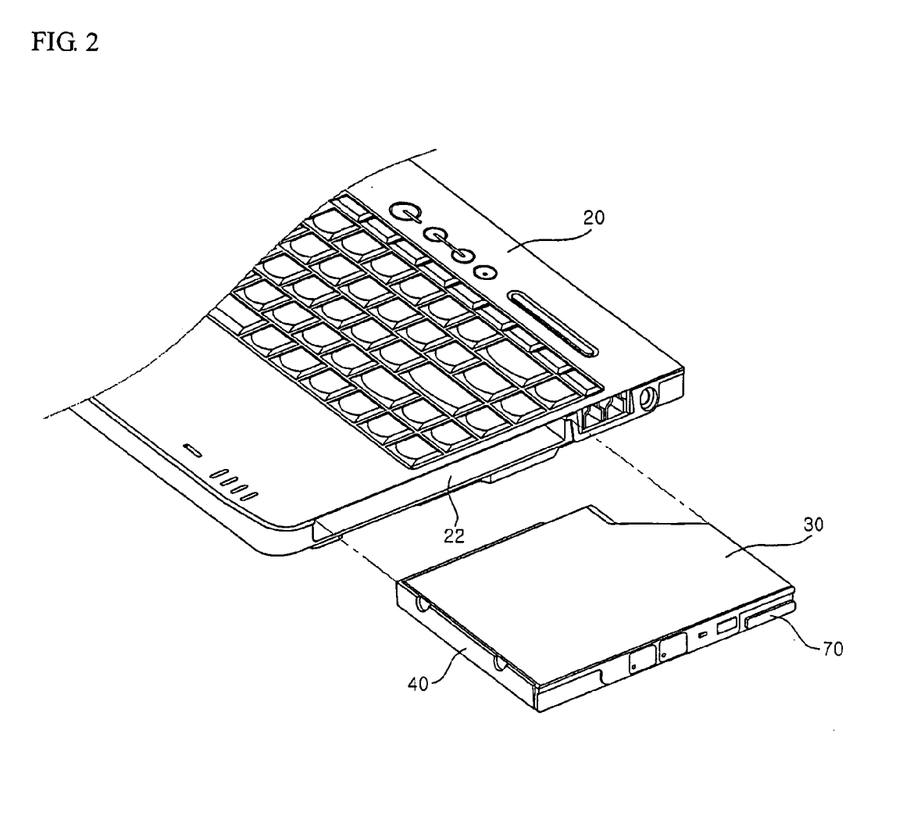
FIG. 2 is a diagram showing an exploded perspective view of the configuration of a portable computer in which a preferred embodiment of a device swapping apparatus according to the present invention is employed.
Figure 3:
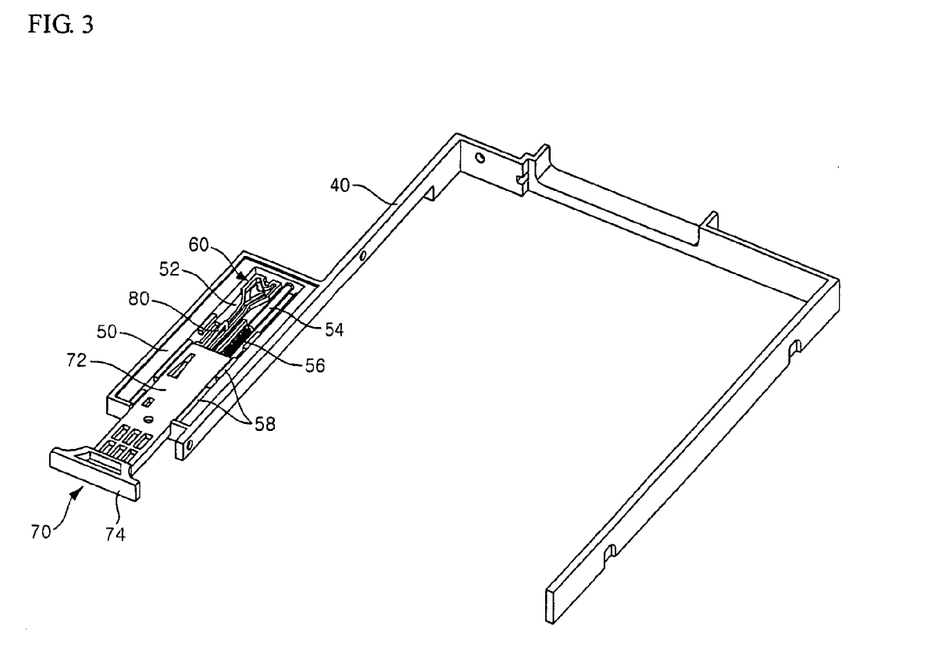
FIG. 3 is a diagram showing a perspective view of a preferred embodiment according to the present invention.
Figure 4:
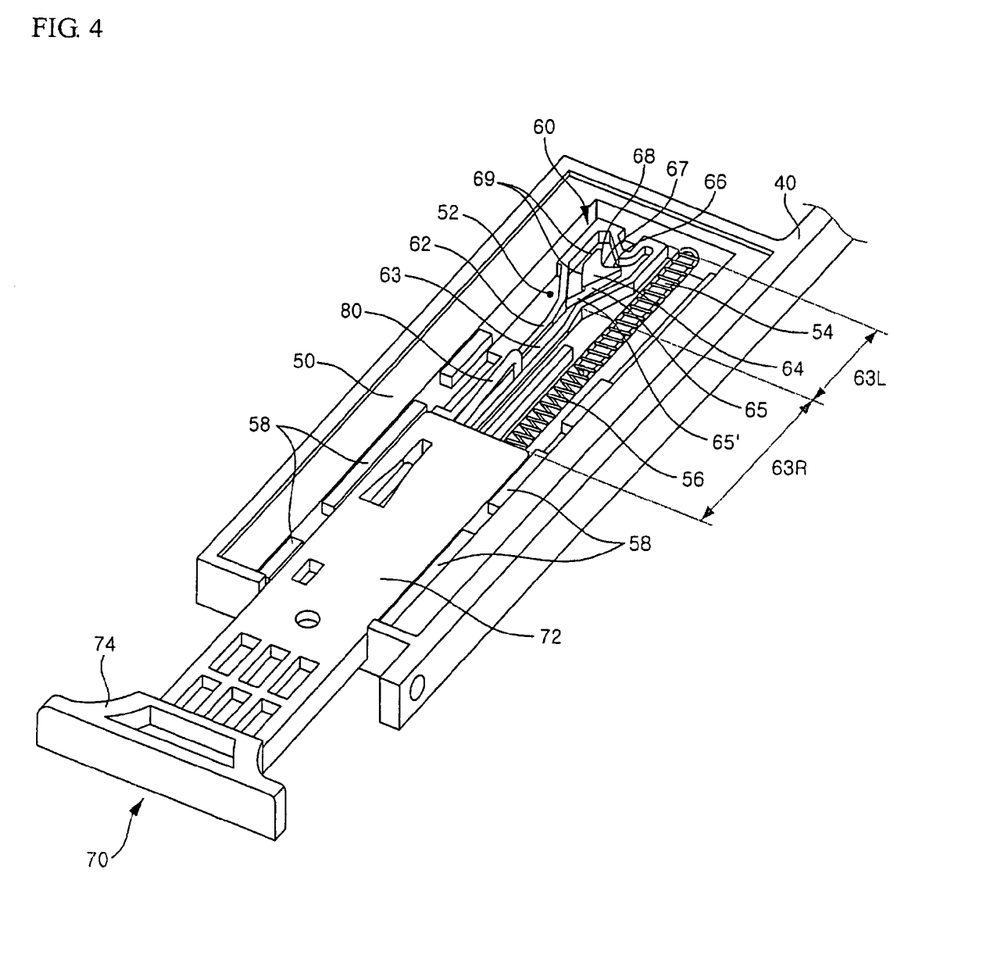
FIG. 4 is a diagram showing a perspective view of a configuration of a preferred embodiment according to the present invention.
Figure 5A:
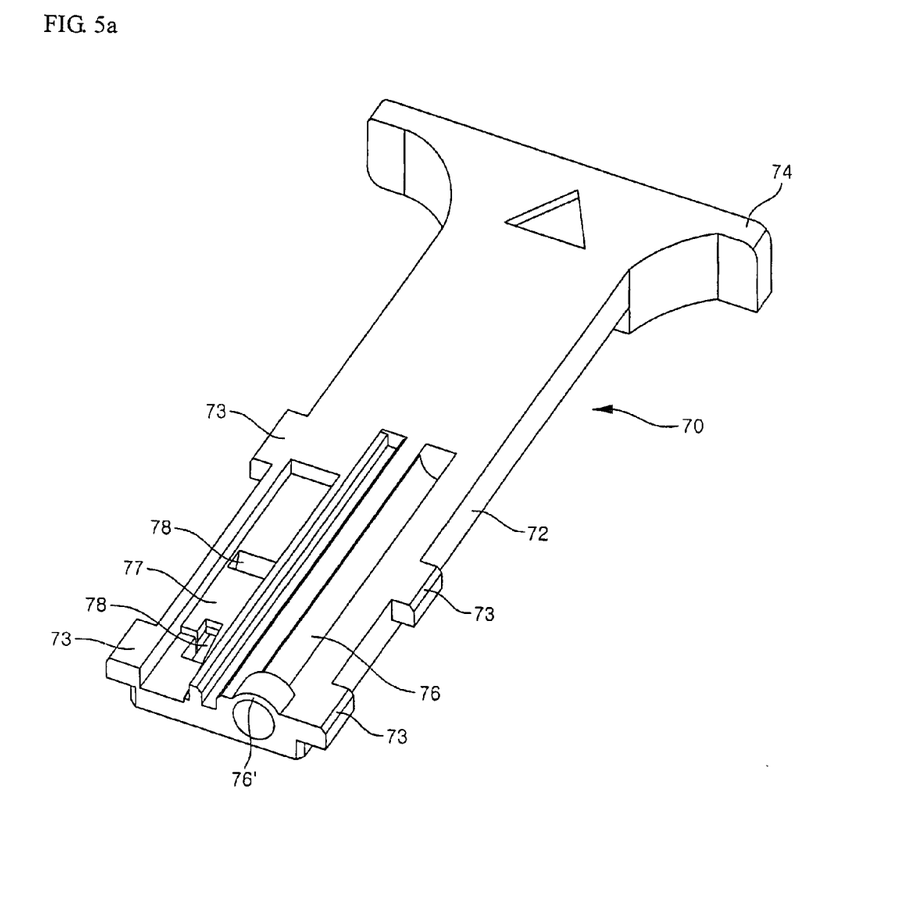
FIG. 5a is a perspective view showing an exemplary driving rod of the device swapping apparatus according to the embodiment of the present invention.
Figure 5B:
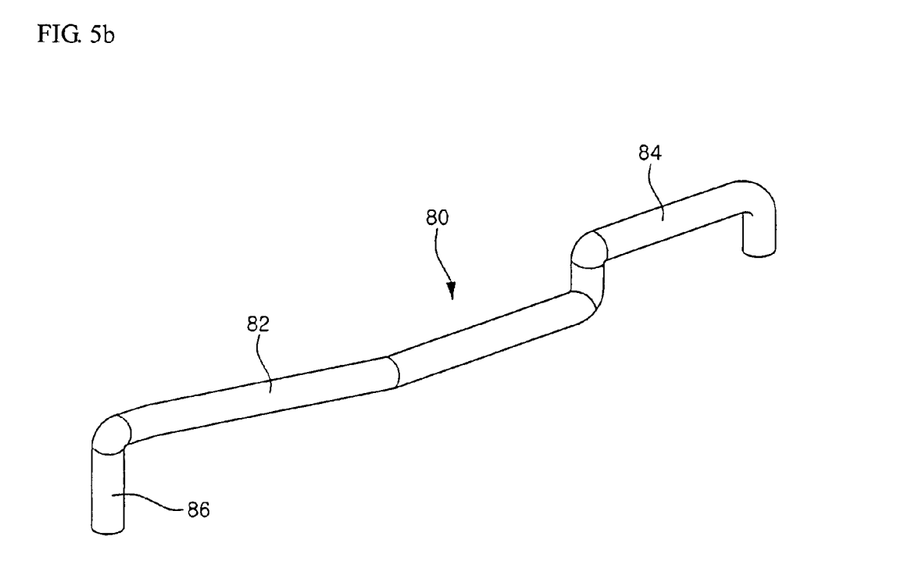
FIG. 5b is a perspective view showing an exemplary cam follower of the device swapping apparatus according to the embodiment of the present invention.

FIG. 2 is an exploded perspective view showing a configuration of an embodiment of a portable computer in which a device swapping apparatus according to the present invention is employed, and FIGS. 3–4 are perspective views showing configuration of the device swapping apparatus according to the embodiment. FIG. 5a is a perspective view showing an exemplary driving rod of the device swapping apparatus according to the embodiment, and FIG. 5b is a perspective view of exemplary cam follower of a device swapping apparatus.

As shown in FIGS. 3–5b, a bay 22 can be provided at a portion in a lateral surface of a main unit 20 of the portable computer. The bay 22 is a portion into which a detachable device 30 can be mounted.

A variety of detachable devices 30 necessary or useful for the portable computer can be mounted in the bay 22. Examples of the detachable devices 30 may include an optical disk drive, a battery, a heat radiating unit, and the other devices. However, the present invention is not intended to be so limited. Each of the detachable devices 30 can be designed to have such an external appearance that can be accommodated in the bay 22.

A device holder 40 can be fastened to the exterior of the detachable device 30. In this embodiment, the device holder 40 can have a 'Π' shape such that it surrounds the opposite lateral surfaces and rear surface of the detachable device 30. That is, the device holder 40 is preferably fastened to at least one of the surfaces except a front surface, which is exposed to the opening of the bay, and top and bottom surfaces of the detachable device 30. One reason is that the height of the main unit 20 may be increased if the device holder 40 is fastened to the top and/or bottom surfaces of the detachable device 30. Further, one reason that the device holder 40 is not fastened to the front surface exposed to the opening of the bay 22 is that the front surface becomes an entrance of the disk, for example, where the detachable device is a disk drive.

A housing 50 can be provided on a side of the device holder 40. The housing 50 can be integrally formed on the side of the device holder 40. The housing 50 is preferably positioned at a stepped portion of the side of the detachable device 30. Thus, a device swapping apparatus can be within a footprint of the detachable device 30 in the main unit 20. The housing 50 can be formed with a seating space 52 opened to one surface thereof and formed to extend in a direction from the rear to the front of the detachable device 30. A front face of the seating space 52 can be located at the entrance of the bay 22 for the detachable device 30 can be opened to the front of the detachable device 30.

A guide rod 54 can be provided in the seating space 52 to extend in a direction in which a driving rod 70 can reciprocably move. The guide rod 54 can be integrally formed on the housing 50 with a spring 56 installed around the guide rod 54. The spring 56 can be a cylindrical coil spring and impart an elastic force to the driving rod 70.

Guide rails 58 can be formed along both side ends of the seating space 52. Each of the guide rails 58 can serve to guide the movement of the driving rod 70 in the seating space 52. The guide rail 58 can be formed discontinuously along the both side ends of the seating space 52.

A cam 60 can be formed within the seating space 52. The cam 60 can allow the driving rod 70 alternately to be seated in or to protrude forwardly from the seating space 52. An exemplary configuration of the cam 60 will now be described.

A cam fence 62 can protrude in the seating space 52 to form a frame of the cam 60. A cam path 63 can be defined, for example, within the cam fence 62. The cam path 63 can become a path along which a hook protrusion 86 of a cam follower 80 (described below) is moved. The cam path 63 can be mainly divided into a release section 63R and a hook section 63L. If the hook protrusion 86 of the cam follower 80 remains in the release section 63R, it is in a state where the cam follower 80 is not caught in the cam 60. In the hook section 63L, however, the cam follower 80 can be caught on a cam protrusion 64.

The cam protrusion 64 can be formed in a position within the hook section among an internal area defined by the cam fence 62. For example, the cam protrusion 64 can be generally shaped as a heart. However, the present invention is not intended to be so limited.

Between the outer circumference of the cam protrusion 64 and the cam fence 62 can be a predetermined gap, which in turn becomes the cam path 63. An entry guide surface 65 can be provided on the cam protrusion in congruity with the release section 63R. The entry guide surface 65 preferably allows the hook protrusion 86 of the cam follower 80 to be guided into the hook section 63L. A stepped portion 65', which can continue from a front end of the entry guide surface 65, can be formed on the floor of the cam path 63. The stepped portion 65' can serve to reduce the likelihood or prevent the hook protrusion 86 from being guided to an exit guide surface 69 of the cam protrusion 64.

A hook guide surface 66 can be formed on the cam protrusion 64 at a position where the entry guide surface 65 ends. The hook guide surface 66 can be formed at the position where the entry guide surface 65 ends, so that it is generally inclined in a direction opposite to a guide direction of the entry guide surface 65. A hook portion 67 can be formed at an end portion of the hook guide surface 66. The hook portion 67 is a portion in which the hook protrusion 86 of the cam follower 80 can be caught.

A release guide surface 68 can be formed to be inclined from the hook portion 67 in a direction opposite to a guide direction of the hook guide surface 66. As shown in FIG. 7a–7f, the release guide surface 68 and the hook guide surface 66 can form a V shape. However, the present invention is not intended to be so limited.

The exit guide surface 69, which continues from an end portion of the release guide surface 68, can be formed on the cam protrusion 64. The exit guide surface 69 can be coupled to the front end of the entry guide surface 65. The exit guide surface 69 and the entry guide surface 65 can also form a V shape.

The entry, hook, release and exit guide surfaces 65, 66, 68 and 69, which can be formed sequentially around the circumference of the cam protrusion 64, are designed to be spaced apart from the cam fence 62 by a substantially constant interval, respectively. Further, when it goes along the cam path 63 around the cam protrusion 64 in the order of the entry, hook, release and exit guide surfaces 65, 66, 68 and 69, the floor of the cam path can be gradually raised and then suddenly lowered at the stepped portion 65'.

As shown in FIG. 4, the driving rod 70 can be mainly composed of a rod body 72 and a handle 74. The rod body 72 can be installed within the seating space 52 of the housing 50. The rod body 72 can take the shape as the seating space 52. The rod body 72 can be rectangular in section and take the shape of a flat hexahedron elongated in one direction. Guides 73 can be discontinuously formed along both side ends of the rod body 72 and cooperate with the guide rails 58 to allow the rod body 72 to be moved (e.g., in a single reciprocating movement) within the seating space 52 and also to limit the protruding degree of the rod body 72 from the seating space 52.

As shown in FIG. 5a, a rod seating channel 76 can be formed in the rod body 72 of the driving rod 70. The guide rod 54 is preferably positioned in the rod seating channel 76 as the driving rod 70 moves. A seated end 76' can be formed at a tip end of the rod body 72 corresponding to an entrance of the rod seating channel 76. The seated end 76' can be a portion on which an end of the spring 56 is supported.

A fixing channel 77 can be formed in the rod body in parallel with the rod seating channel 76. A fixing portion 84 of the cam follower 80 can be positioned and fixed in the fixing channel 77. Two hooking holes 78 can be formed in the fixing channel 77 at a regular interval.

As shown in FIG. 5b, a follower body 82 of the cam follower 80 can be formed by bending a wire or the like with a predetermined diameter. However, the present invention is not intended to be so limited. The follower body 82 can be formed with the fixing portion 84 at an end thereof. The fixing portion 84 can be bent to have a 'Π' shape and passes through the two hooking holes 78 to be fixed in the fixing channel 77.

The cam follower 80 can be formed with the hook protrusion 86 at the other end thereof. The hook protrusion 86 is preferably bent to be perpendicular to the extending direction of the cam follower 80. The hook protrusion 86 can be guided along the cam path 63 such that the driving rod 70 can be received in or protrude from the seating space 52.

Operations of an embodiment of a device swapping apparatus for the portable computer according to the present invention will now be described. The detachable device 30 can be mounted in the bay 22 of the main unit 20.

When the detachable device 30 is mounted in the bay 22, only the front surface thereof is preferably exposed to the outside of the main unit 20. At this time, the handle 74 of the driving rod 70 can also be exposed toward the front surface (e.g., evenly with the front surface) of the detachable device 30.

To detach the detachable device 30 from the bay 22 of the main unit 20 in such a state, a knob (not shown) or the like by which the detachable device 30 can be fastened to the main unit 20 can be first released. The knob is generally provided on the floor of the main unit 20. If the knob is released, the detachable device 30 can be detached from the bay 22.

Figure 6:
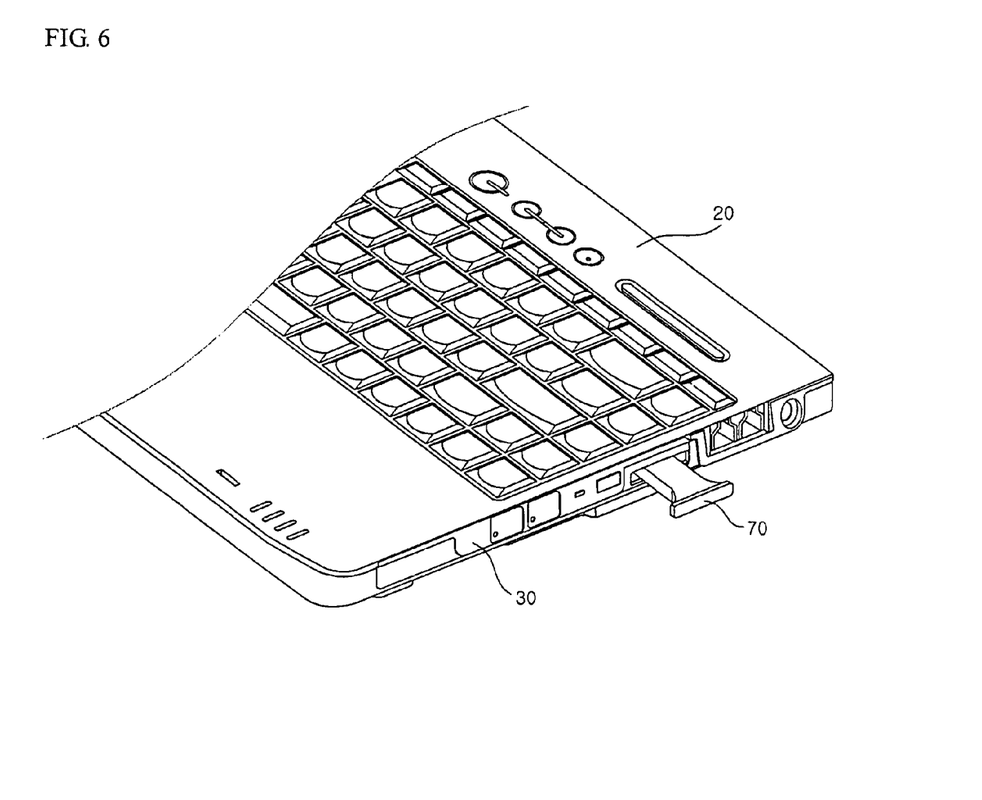
FIG. 6 is a diagram illustrating an operating state where a handle of the driving rod protrudes outwardly from the portable computer according to the embodiment of the present invention.

In the meantime, a state where the driving rod 70 does not protrude from the front surface of the detachable device 30 can correspond to a state where the hook protrusion 86 of the cam follower 80 is caught in the hook portion 67 of the cam protrusion 64. As shown in FIG. 6, the hook protrusion 86 can be positioned on the cam path 63 corresponding to the release section 63R out of the cam protrusion 64 when the driving rod 70 protrudes from the front surface of the detachable device 30.

Figure 7A:
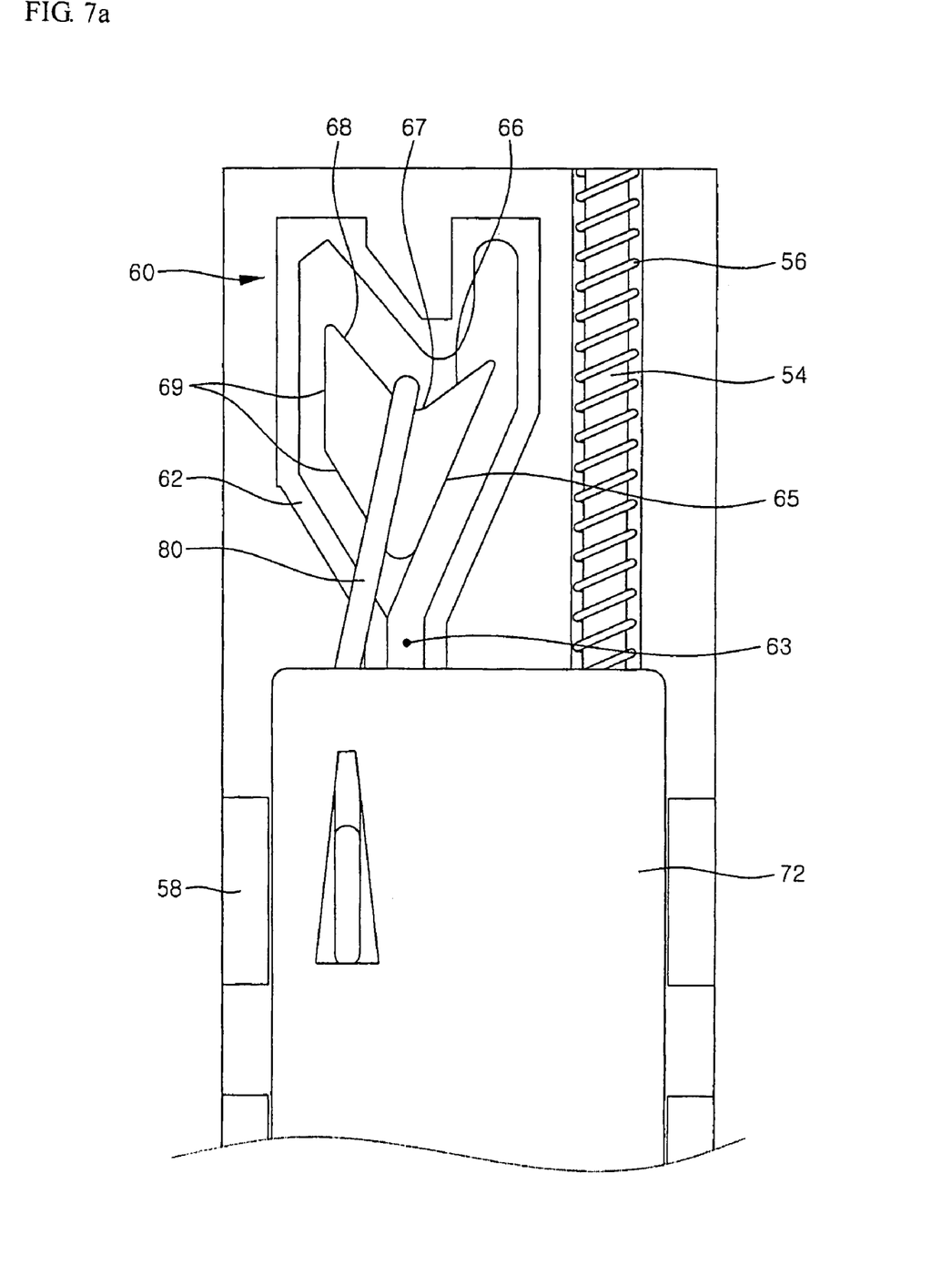
FIGS. 7a to 7g are diagrams illustrating a sequentially operating process where the cam and cam follower are interlocked with each other according to a preferred embodiment of the present invention.

Upon use of the detachable device 30, the handle 74 of the driving rod 70 should be first in a state where it does not protrude from the front surface of the detachable device. For example, as shown in FIG. 7a, the hook protrusion 86 should be caught in the hook portion 67 of the cam protrusion 64. At this time, although the spring 56 can urge or cause the rod body 72 to be pushed outward from the seating space 52, the driving rod 70 cannot protrude outward from the front surface of the detachable device since the hook protrusion 86 of the cam follower 80 can be caught in the hook portion 67.

To detach the detachable device 30 from the bay 22, the knob should be first manipulated to unfasten of the detachable device 30. The handle 74 can be caused to protrude outwardly, and then, the handle 74 should be merely pulled outwardly.

Figure 7B:
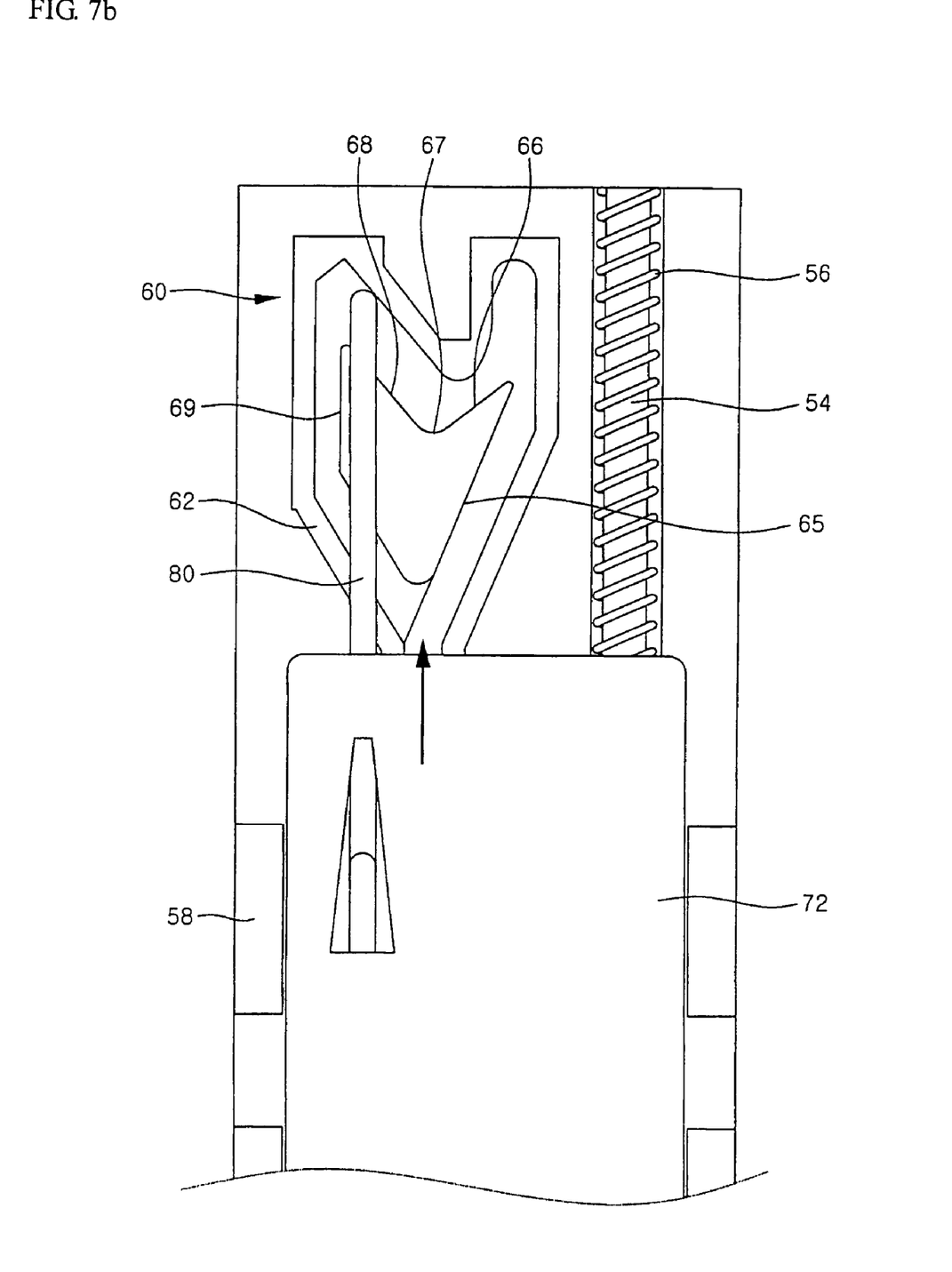

Such operations will now be described. If the user presses the handle 74 of the driving rod 70, the rod body 72 can be moved in a direction of an arrow against the elastic force of the spring 56 as shown in FIG. 7b. Therefore, the hook protrusion 86 can be guided along cam fence 62 facing the release guide surface 68.

Figure 7C:
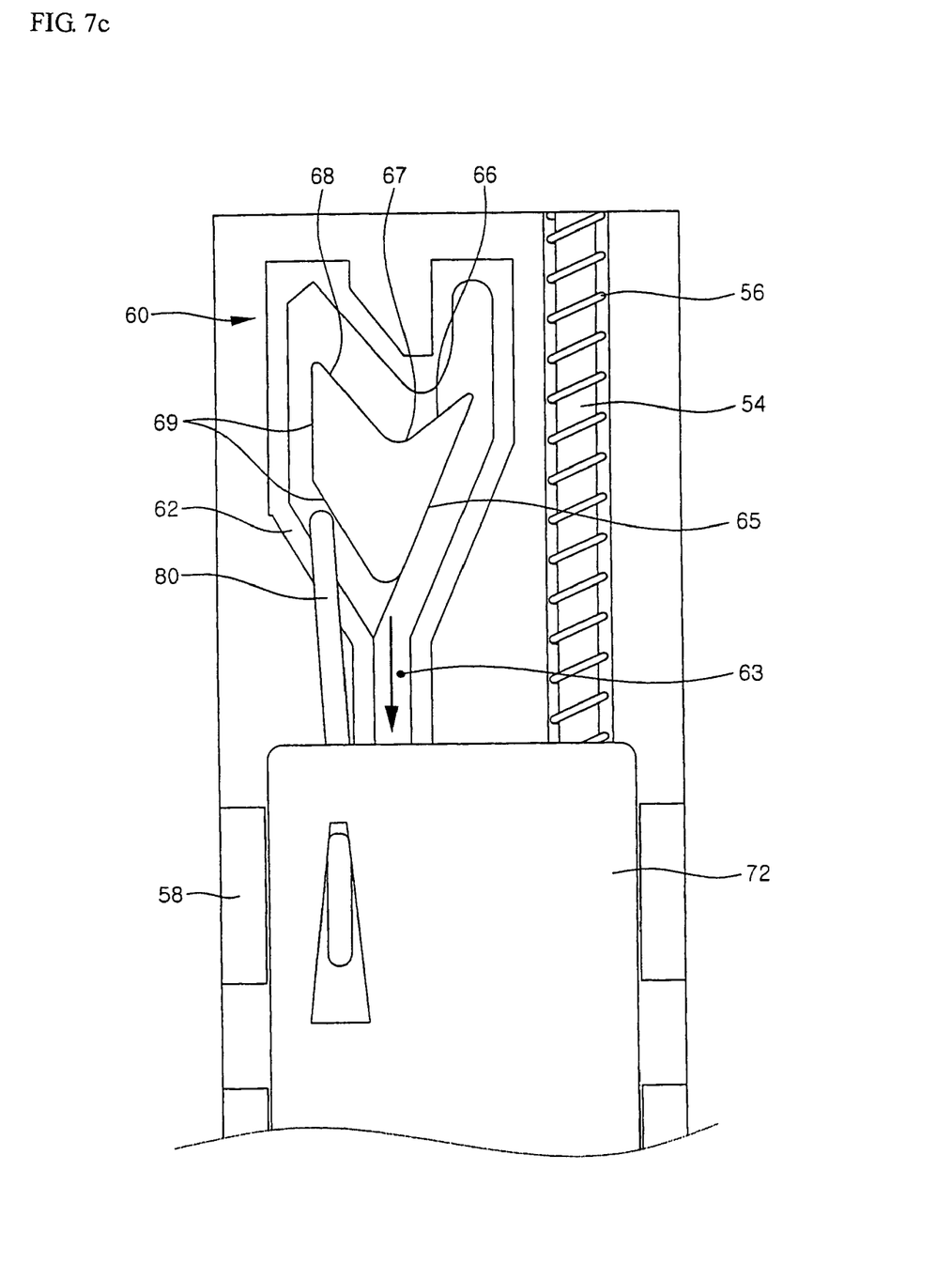

If the user release the force exerted on the driving rod 70 after the hook protrusion 86 has exceeded a position corresponding to the end portion of the release guide surface 68, both the rod body 72 and the cam follower 80 can be moved in a direction of an arrow due to the restoring force of the spring 56 as shown in FIG. 7c. At this time, the hook protrusion 86 can be guided along the exit guide surface 69 or the cam fence 62 facing the exit guide surface.

Figure 7D:
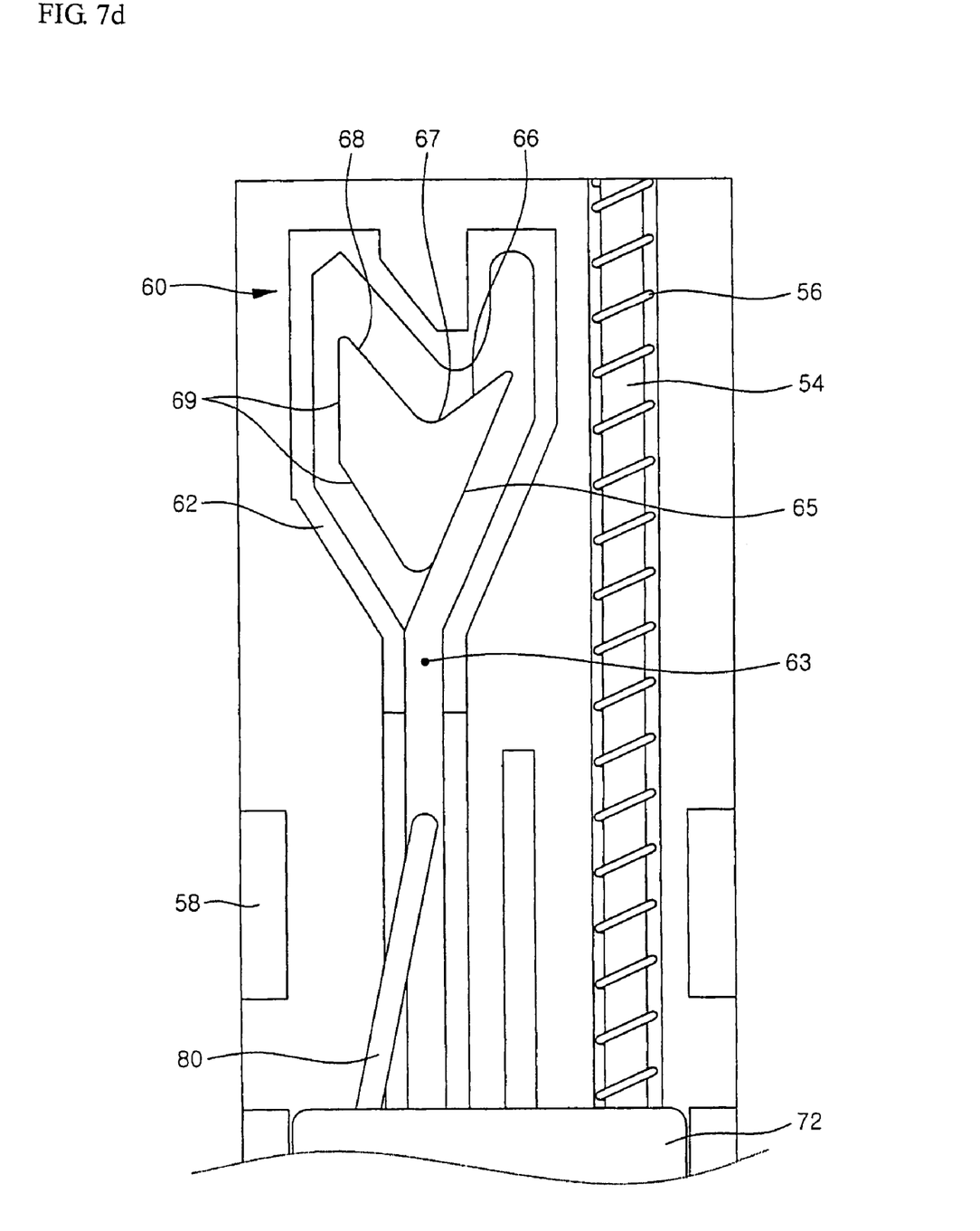

The movement of the hook protrusion 86 along the exit guide surface 69 or corresponding cam fence 62 can be automatically made because of the restoring force of the spring 56. When the hook protrusion 86 has passed over the stepped portion 65' and reached the release section 63R of the cam path 63, the driving rod 70 is in a state where it protrudes outwardly. At this time, the guides 73 may also serve to prevent the driving rod 70 from protruding outwardly beyond a prescribed point, for example, as shown in FIG. 7d.

If the handle 74 of the driving rod 70 is pulled outward in a state where the handle 74 protrude forwardly, the detachable device 30 can be detached from the bay 22. One reason is that the device holder 40, which is integrally formed with the housing 50 with the driving rod 70, can be fastened to the detachable device 30.

Figure 7E:
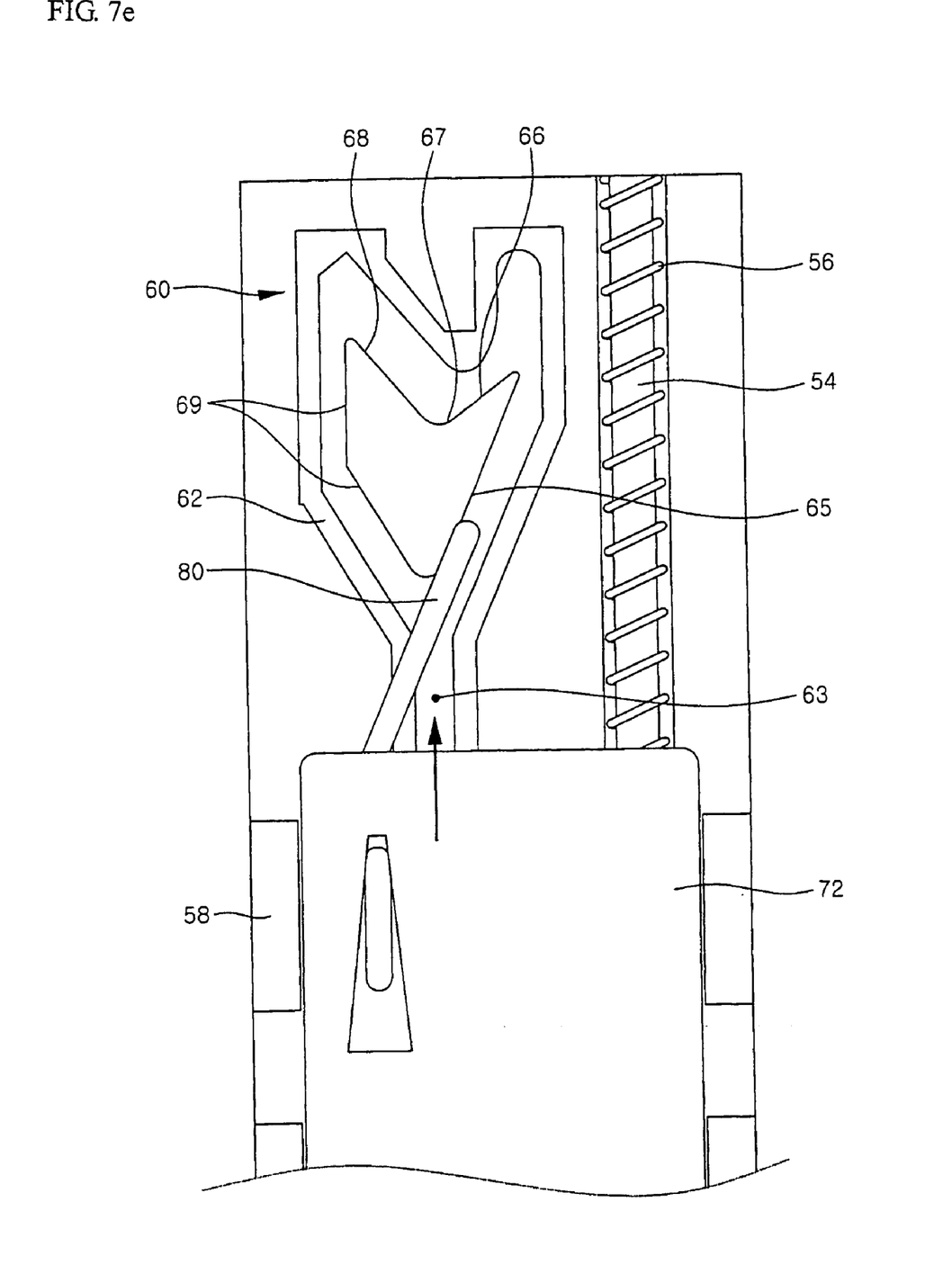

Operations will now be described for how the driving rod 70 can be received in the bay 22. If the user presses the handle 74 with his/her hand, the hook protrusion 86 can be moved from the release section 63R to the hook section 63L among the cam path 63. For example, when the rod body 72 is moved against the elastic force of the spring 56, the hook protrusion 86 can be guided along the entry guide surface 65. For example, the stepped portion 65' can prevent the hook protrusion 86 from moving toward the exit guide surface 69. FIG. 7e illustrates that the hook protrusion 86 is guided along the entry guide surface 65.

Figure 7F:
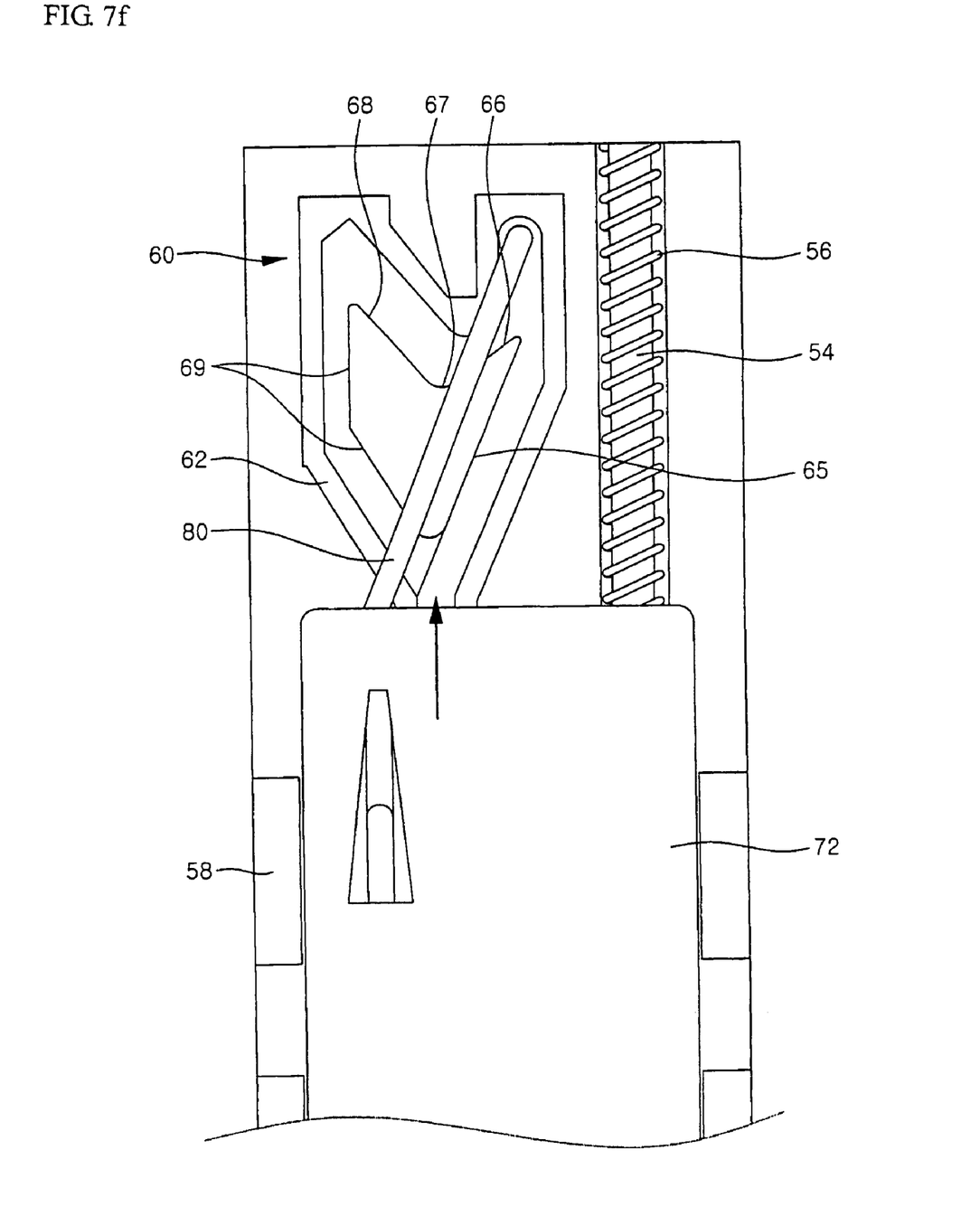

If the hook protrusion 86 passes over the entry guide surface 65 as the user pushes the driving rod 70, the hook protrusion 86 can be guided to a portion on the cam fence 62 facing the hook guide surface 66 as shown in FIG. 7f. At this time, it can be a state where the guide rod 54 is inserted to the utmost in the rod seating channel 76.

Figure 7G:
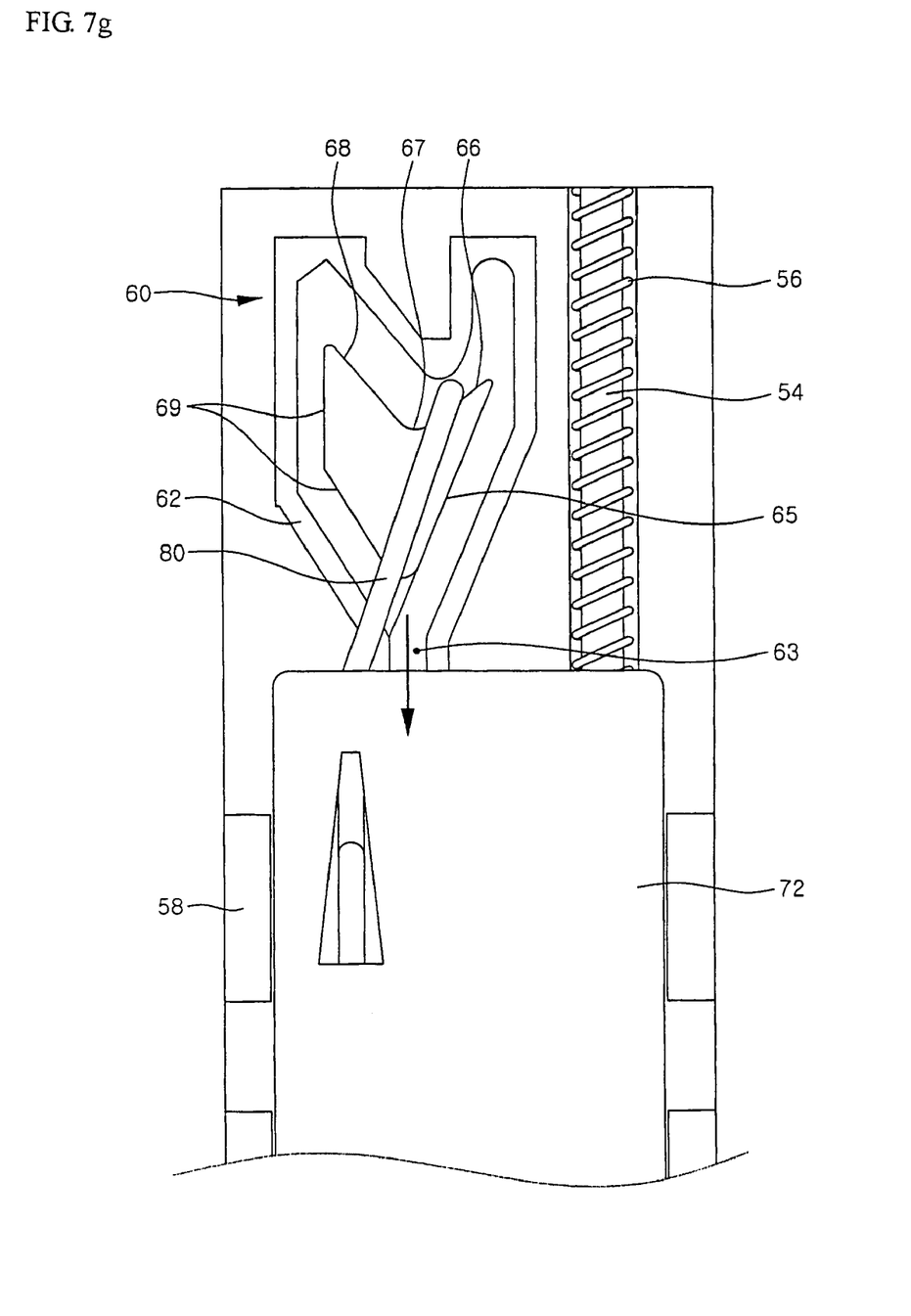

If the user releases the force exerted on the driving rod 70 in such a state, the driving rod 70 can be moved in a direction of an arrow shown in FIG. 7g due to the restoring force of the spring 56 and then guided along hook guide surface 66 or corresponding cam fence 62. Further, the hook protrusion 86 is preferably caught in the hook portion 67 of the cam protrusion 64. In such a state, the handle 74 does not protrude outwardly as shown in FIG. 2.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As described above, embodiments of a device swapping apparatus and method for a portable computer according to the present invention have various advantages. In embodiments of the present invention, to detach a detachable device from a bay of the portable computer, a user can cause a driving rod to protrude and then to be pulled outwardly. Therefore, since it can be easy to detach the detachable device from the portable computer, there is an advantage in that the user's convenience can be improved. Further, since a mechanism for detaching the detachable device from the bay of the portable computer can be integrally formed on the detachable device itself and also particularly installed within a space defined between the detachable device a surface (e.g., the floor) of the bay, there is another advantage in that the portable computer can be made light, thin or small. In addition, since components of the mechanism can be installed at a side of the detachable device or the configuration thereof are also simplified, there is a further advantage in that the reliability in its operation can be enhanced or the production costs can be reduced.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A device swapping apparatus for a portable computer, comprising:
   a detachable device;
   a handle coupled to the detachable device, wherein the handle is within the area of the detachable device, wherein the handle moves between a first position extending partially outside the detachable device and a second position; and
   an engagement device configured to engage the handle when the handle moves between the first position and the second position, wherein the engagement device includes a path having opposing side surfaces and a bottom surface therebetween, wherein the path has an entrance portion, a holding portion, and an exit portion, wherein the exit portion of the path has an inclined bottom surface that is higher where the exit portion meets the path than where the entrance portion meets the path.

2. The apparatus of claim 1, comprising:
   a housing provided at the side of a detachable device.

3. The apparatus of claim 1, wherein in the first position, the handle is used to remove the detachable device from the portable computer, and wherein the handle is removed with the detachable device.

4. The apparatus of claim 1, wherein in the second position, the handle is retracted into the detachable device.

5. The apparatus of claim 1, wherein the detachable device is an optical disk drive, a FDD, a HDD, a battery, a digital multimedia broadcasting (DMB) module, a cardbus device or a storage medium.

6. The apparatus of claim 1, wherein the handle has a thickness less than the detachable device.

7. A device swapping apparatus for a portable computer, comprising:
   a housing coupled within a lateral surface of a detachable device having a seating space therein;
   a driving rod including a rod body slidingly positioned within the seating space of the housing, and a front handle configured to selectively protrude forward from the housing;
   a cam and cam follower configured to selectively operate so that the rod body is either fastened in or protrudes from the seating space whenever the driving rod is pushed into the seating space; and
   an elastic member configured to provide an elastic force in a direction to urge the driving rod from the seating space, wherein the cam is formed in the seating space of the housing, and wherein the cam follower includes a hook protrusion, having a front end thereof guided along the cam, and a rear end thereof fixed to the driving rod, wherein the cam and side surfaces in the seating space are connected by a bottom surface to form a "U" shaped path, wherein the path includes an entrance portion, a holding portion and an exit portion, and wherein the exit portion has an inclined bottom surface that is higher where the exit portion meets the path.

8. The apparatus of claim 7, wherein the housing is coupled to a device holder fastened to at least one side surface of the detachable device.

9. The apparatus of claim 8, wherein the device holder is integrally formed as one body with the detachable device.

10. The apparatus of claim 9, wherein the device holder is part of the detachable device.

11. The apparatus of claim 8, wherein the device holder is fastened to opposite lateral surfaces and a rear surface of the detachable device.

12. The apparatus of claim 7, wherein the elastic member is a cylindrical coil spring wound around a guide rod elongated within the seating space of the housing along a sliding direction of the driving rod, and wherein an end of the guide rod is supported on a seated end of the rod body.

13. The apparatus of claim 12, wherein the rod body of the driving rod is configured to have a rod seating space in which the guide rod is selectively inserted, further comprising:
guide rails formed on both side ends of the seating space of the housing configured to limit an extent the rod body protrudes from the housing.

14. The apparatus of claim 7, wherein the cam follower travels in a single direction along the path as the driving rod is repeatedly pushed into and retracted from the housing.

15. A portable computer, comprising:
a main body rotatably attached to a display body;
a device detachably installed in a surface of the main body; and
a handle inside the device, wherein the handle is configured to move between at least two positions, wherein the handle comprises,
a first portion fixedly coupled to the device,
a second portion configured to movably mount on the first portion to extend from and retract into the device, and
a recessed path in the first portion having an entrance portion, a holding portion and an exit portion, wherein the recessed path includes opposing side walls connected by a bottom surface, and wherein the exit portion has an inclined bottom surface that is higher where the exit portion meets the path than where the entrance portion meets the path.

16. The portable computer of claim 15, wherein the detachable device is an optical disk drive, a FDD, a HDD, a battery, a digital multimedia broadcasting module, a cardbus device or a storage medium.

17. The portable computer of claim 15, wherein the first and second portions are resiliently engaged, and wherein a protruded portion of the second portion moves along the recessed path as the handle moves between first and second positions.

18. A portable computer, comprising:
a main body rotatably attached to a display body;
a device detachably installed in a surface of the main body; and
a handle inside the device, wherein the handle is configured to move between at least two positions, wherein the handle comprises,
a first portion fixedly coupled to the device,
a second portion configured to movably mount on the first portion to extend from and retract into the device, and
a cam and cam follower configured to selectively operate so that the second portion is either fastened in or protrudes from the first portion whenever the second portion is pushed into the first portion, wherein the cam is formed in the first portion, and wherein the cam follower includes a hook protrusion, having a front end thereof guided along the cam, and a rear end thereof fixed to the second portion, wherein the cam and side surfaces in the first portion form a path having two side surfaces connected by a bottom surface, wherein the path includes an entrance portion, a holding portion and an exit portion, and wherein the exit portion has an inclined bottom surface that is higher where the exit portion meets the path.

19. The portable computer of claim 18, wherein the inclined portion of the exit portion delineates a side of the exit portion adjacent the path to force the cam follower into the entrance portion when the cam follower is retracted into the device.

* * * * *